United States Patent
Wu et al.

(10) Patent No.: US 12,262,352 B2
(45) Date of Patent: Mar. 25, 2025

(54) DUAL-MODE SIDELINK OPERATION

(71) Applicant: Apple Inc., Cupertino, CA (US)

(72) Inventors: Zhibin Wu, Los Altos, CA (US);
Dawei Zhang, Saratoga, CA (US);
Fangli Xu, Beijing (CN); Haijing Hu, Los Gatos, CA (US); Murtaza A. Shikari, Mountain View, CA (US);
Clive E. Rodgers, Palo Alto, CA (US);
Sethuraman Gurumoorthy, San Ramon, CA (US); Sree Ram Kodali, San Jose, CA (US); Srinivasan Nimmala, San Jose, CA (US); Srirang A. Lovlekar, Fremont, CA (US); Vijay Venkataraman, San Jose, CA (US);
Longda Xing, San Jose, CA (US);
Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 423 days.

(21) Appl. No.: 17/764,481

(22) PCT Filed: Sep. 29, 2019

(86) PCT No.: PCT/CN2019/108866
§ 371 (c)(1),
(2) Date: Mar. 28, 2022

(87) PCT Pub. No.: WO2021/056505
PCT Pub. Date: Apr. 1, 2021

(65) Prior Publication Data
US 2022/0394677 A1 Dec. 8, 2022

(51) Int. Cl.
*H04W 72/02* (2009.01)
*H04W 36/00* (2009.01)
(Continued)

(52) U.S. Cl.
CPC ....... *H04W 72/02* (2013.01); *H04W 36/0061* (2013.01); *H04W 72/0446* (2013.01);
(Continued)

(58) Field of Classification Search
CPC ............. H04W 72/02; H04W 36/0061; H04W 72/0446; H04W 72/0453; H04W 36/037; H04W 92/18
See application file for complete search history.

(56) References Cited

U.S. PATENT DOCUMENTS

2016/0037399 A1* 2/2016 Li ..................... H04W 36/0016
455/436
2017/0041902 A1* 2/2017 Sheng .................. H04W 72/02
(Continued)

FOREIGN PATENT DOCUMENTS

CN 109526247 A 3/2019
CN 109644433 4/2019
(Continued)

OTHER PUBLICATIONS

Extended European Search Report for EP Patent Application No. 19947290.3; Feb. 22, 2023.
(Continued)

*Primary Examiner* — Jael M Ulysse
(74) *Attorney, Agent, or Firm* — Kowert, Hood, Munyon, Rankin & Goetzel, P.C.

(57) ABSTRACT

Embodiments are presented herein of apparatuses, systems, and methods for a C-V2X capable wireless device configured to operate according to a first sidelink mode where communication resources are allocated by a network and a second sidelink mode where communication resources are autonomously allocated by the wireless device. The wireless device detects a change in a coverage scenario associated with the first sidelink mode; performs resource sensing for
(Continued)

the second sidelink mode; and based at least in part on detecting the change in the coverage scenario, transmits first communications using the second sidelink mode, wherein resources for transmitting the first communications are allocated based at least in part on the resource sensing.

20 Claims, 8 Drawing Sheets

(51) Int. Cl.
*H04W 72/0446* (2023.01)
*H04W 72/0453* (2023.01)
*H04W 92/18* (2009.01)

(52) U.S. Cl.
CPC ...... *H04W 72/0453* (2013.01); *H04W 36/037* (2023.05); *H04W 92/18* (2013.01)

(56) References Cited

U.S. PATENT DOCUMENTS

| | | | | |
|---|---|---|---|---|
| 2017/0048888 | A1* | 2/2017 | Belleschi | H04W 8/005 |
| 2017/0135074 | A1* | 5/2017 | Yi | H04W 72/02 |
| 2017/0230918 | A1* | 8/2017 | Ryu | H04W 52/367 |
| 2018/0092065 | A1* | 3/2018 | Sheng | H04W 74/006 |
| 2018/0206260 | A1* | 7/2018 | Khoryaev | H04W 72/56 |
| 2018/0227882 | A1* | 8/2018 | Freda | H04W 56/001 |
| 2018/0234947 | A1* | 8/2018 | Wu | H04W 72/40 |
| 2018/0332585 | A1 | 11/2018 | Faurie | |
| 2019/0075548 | A1* | 3/2019 | Lee | H04W 4/40 |
| 2019/0116475 | A1* | 4/2019 | Lee | H04W 72/542 |
| 2019/0116586 | A1* | 4/2019 | Basu Mallick | H04W 72/02 |
| 2019/0124015 | A1* | 4/2019 | Loehr | H04W 76/23 |
| 2019/0124653 | A1* | 4/2019 | Chae | H04W 72/0446 |
| 2019/0132818 | A1* | 5/2019 | Yasukawa | H04W 72/02 |
| 2019/0132832 | A1* | 5/2019 | Uchiyama | H04W 72/56 |
| 2019/0182806 | A1* | 6/2019 | Chae | H04W 72/51 |
| 2019/0215801 | A1* | 7/2019 | Mok | H04W 76/27 |
| 2019/0254059 | A1* | 8/2019 | Gulati | H04W 72/542 |
| 2019/0281641 | A1* | 9/2019 | Cheng | H04L 41/08 |
| 2019/0306835 | A1* | 10/2019 | Hoang | H04W 72/53 |
| 2019/0306912 | A1* | 10/2019 | Cheng | H04W 76/27 |
| 2019/0320415 | A1* | 10/2019 | Seo | H04W 76/15 |
| 2019/0357025 | A1* | 11/2019 | Hwang | H04W 8/24 |
| 2020/0146066 | A1* | 5/2020 | Nguyen | H04W 72/12 |
| 2021/0160965 | A1* | 5/2021 | Ji | H04W 72/54 |
| 2021/0392654 | A1* | 12/2021 | Lin | H04W 76/27 |

FOREIGN PATENT DOCUMENTS

| | | |
|---|---|---|
| KR | 10-1153641 | 6/2012 |
| WO | 2017052686 A1 | 3/2017 |
| WO | 2018201390 A1 | 11/2018 |
| WO | 2019022470 | 1/2019 |
| WO | 2019028900 | 2/2019 |
| WO | 2019066706 | 4/2019 |
| WO | 2019099535 A1 | 5/2019 |

OTHER PUBLICATIONS

Ericsson "Simultaneous operation of Mode 1 and Mode 2"; 3GPP TSG-RAN WG1 Meeting #97 R1-1907139; Reno, US; May 13, 2019.
Office Action for CN Patent Application No. 201980100875.x; Jun. 27, 2024.
Samsung "Mode 4 behavior in shared resource pools for V2X phase 2"; 3GPP TSG-RAN WG2 Meeting #101 R2-1803039; Feb. 26, 2018.
International Search Report and Written Opinion for PCT/CN2019/108866; 9 pages; Jun. 30, 2020.
Samsung "Mode 4 behavior in shared resource pools for V2X phase 2;" 3GPP TSG RAN WG2 Meeting #101 bis R2-1806113; Sanya, China; 3 pages; Apr. 20, 2018.
Office Action for KR Patent Application No. 10-2022-7010405; Jul. 26, 2024.
Huawei et al. "Consideratoins on sidelink for handling Uu interruptions"; 3GPP TSG-RAN WG2 #107 R2-1911073; Aug. 26, 2019.
Huawei et al. "Discussion on sidelink resource allocation mode 1"; 3GPP RSG RAN WG1 Meeting #97 R1-1906010; May 13, 2019.
Huawei et al. "Discussion on sidelink resource allocation mode 1"; 3GPP RSG RAN WG1 #96bis R1-1903950; Apr. 8, 2019.

* cited by examiner

DUAL-MODE SIDELINK OPERATION

PRIORITY CLAIM

This application is a national phase entry of PCT application number PCT/CN2019/108866, entitled "Dual-mode Sidelink Operation," filed Sep. 29, 2019, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatuses, systems, and methods for wireless devices to operate in a dual-mode sidelink scenario in vehicle-to-everything (V2X) wireless cellular communications.

DESCRIPTION OF THE RELATED ART

Wireless communication systems are rapidly growing in usage. One proposed use of wireless communications is in vehicular applications, particularly in V2X (vehicle-to-everything) systems. V2X systems allow for communication between vehicles (e.g., via communications devices housed in or otherwise carried by vehicles), pedestrian UEs (including UEs carried by other persons such as cyclists, etc.), networks, and other wireless communications devices for various purposes, such as to coordinate traffic activity, facilitate autonomous driving, and perform collision avoidance.

V2X systems may utilize sidelink communications, wherein two or more V2X systems communicate with each other without routing their communications through an intermediary or a network. Effective utilization of sidelink communications may present unique challenges due to the absence of the network in the communication chain or other reasons. Accordingly, improvements in the field are desirable.

SUMMARY

Embodiments are presented herein of apparatuses, systems, and methods for performing sidelink communications in vehicle-to-everything (V2X) wireless cellular communications.

In some embodiments, a C-V2X capable wireless device is configured to operate according to a first sidelink mode where communication resources are allocated by a network, and a second sidelink mode where communication resources are autonomously selected by the wireless device.

In some embodiments, the wireless device detects a change in a coverage scenario associated with the first sidelink mode; performs resource sensing for the second sidelink mode; and based at least in part on detecting the change in the coverage scenario, transmits first communications using the second sidelink mode, wherein resources for transmitting the first communications are selected based at least in part on the resource sensing.

In some embodiments, the wireless device determines a potential communication resource conflict resultant from operating according to the first sidelink mode and operating according to the second sidelink mode. In response to determining the potential communication resource conflict, a first priority associated with operating according to the first sidelink mode and a second priority associated with operating according to the second sidelink mode may be determined. One of the first sidelink mode or the second sidelink mode may be selected for transmitting communications, and said selecting may be performed based at least in part on a comparison of the first priority and the second priority.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
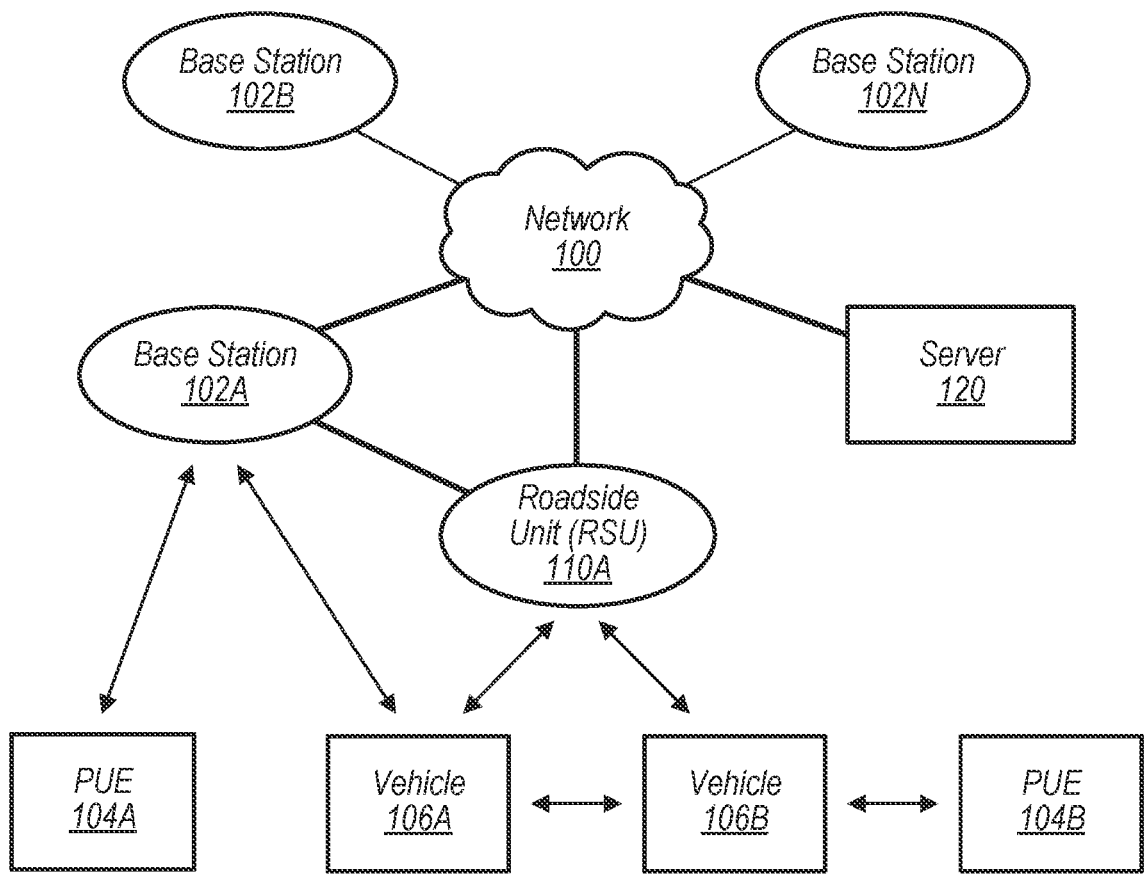
FIG. 1 illustrates an example vehicle-to-everything (V2X) communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Device—as used herein, may refer generally in the context of V2X systems to devices that are associated with mobile actors or traffic participants in a V2X system, i.e., mobile (able-to-move) communication devices such as vehicles and pedestrian user equipment (PUE) devices, as opposed to infrastructure devices, such as base stations, roadside units (RSUs), and servers.

Infrastructure Device—as used herein, may refer generally in the context of V2X systems to certain devices in a V2X system that are not user devices, and are not carried by traffic actors (i.e., pedestrians, vehicles, or other mobile users), but rather that facilitate user devices' participation in the V2X network. Infrastructure devices include base stations and roadside units (RSUs).

User Equipment (UE) (or "UE Device")—any of various types of computer systems or devices that are mobile or portable and that perform wireless communications. Examples of UE devices include mobile telephones or smartphones (e.g., iPhone™ Android™-based phones), portable gaming devices (e.g., Nintendo DS™, PlayStation Portable™, Gameboy Advance™, iPhone™), laptops, wearable devices (e.g. smartwatch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Pedestrian UE (PUE) Device—a user equipment (UE) device as regarded in the context of V2X systems that may be worn or carried by various persons, including not only pedestrians in the strict sense of persons walking near roads, but also certain other peripheral or minor participants, or potential participants, in a traffic environment. These include stationary persons, persons not on vehicles who may not necessarily be near traffic or roads, persons jogging, running, skating, and so on, or persons on vehicles that may not substantially bolster the UE's power capabilities, such as bicycles, scooters, or certain motor vehicles.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—V2X Communication System

FIG. 1 illustrates an example vehicle-to-everything (V2X) communication system, according to some embodiments. It is noted that the system of FIG. 1 is merely one example of a possible system, and that features of this disclosure may be implemented in any of various systems, as desired.

Vehicle-to-everything (V2X) communication systems may be characterized as networks in which vehicles, UEs, and/or other devices and network entities exchange communications in order to coordinate traffic activity, among other possible purposes. V2X communications include communications conveyed between a vehicle (e.g., a wireless device or communication device constituting part of the vehicle, or contained in or otherwise carried along by the vehicle) and various other devices. V2X communications include vehicle-to-pedestrian (V2P), vehicle-to-infrastructure (V2I), vehicle-to-network (V2N), and vehicle-to-vehicle (V2V) communications, as well as communications between vehicles and other possible network entities or devices. V2X communications may also refer to communications between other non-vehicle devices participating in a V2X network for the purpose of sharing V2X-related information.

V2X communications may, for example, adhere to 3GPP Cellular V2X (C-V2X) specifications, or to one or more other or subsequent standards whereby vehicles and other devices and network entities may communicate. V2X communications may utilize both long-range (e.g., cellular) communications as well as short- to medium-range (e.g., non-cellular) communications. Cellular-capable V2X communications may be called Cellular V2X (C-V2X) communications. C-V2X systems may use various cellular radio access technologies (RATs), such as 4G LTE or 5G NR RATs. Certain LTE standards usable in V2X systems may be called LTE-Vehicle (LTE-V) standards.

As shown, the example V2X system includes a number of user devices. As used herein in the context of V2X systems, "user devices" may refer generally to devices that are associated with mobile actors or traffic participants in the V2X system, i.e., mobile (able-to-move) communication devices such as vehicles and pedestrian user equipment (PUE) devices. User devices in the example V2X system include the PUEs 104A and 104B and the vehicles 106A and 106B.

The vehicles 106 may constitute various types of vehicles. For example, the vehicle 106A may be a road vehicle or automobile, a mass transit vehicle, or another type of vehicle. The vehicles 106 may conduct wireless communications by various means. For example, the vehicle 106A may include communications equipment as part of the vehicle or housed in the vehicle, or may communicate through a wireless communications device currently contained within or otherwise carried along by the vehicle, such as a user equipment (UE) device (e.g., a smartphone or similar device) installed within the vehicle or carried or worn by a driver, passenger, or other person on board the vehicle, among other possibilities. For simplicity, the term "vehicle" as used herein may include the wireless communications equipment which represents the vehicle and conducts its communications. Thus, for example, when the vehicle 106A is said to conduct wireless communications, it is understood that, more specifically, certain wireless communications equipment associated with and carried along by the vehicle 106A is performing said wireless communications.

The pedestrian UEs (PUEs) 104 may constitute various types of user equipment (UE) devices, i.e., portable devices capable of wireless communication, such as smartphones, smartwatches, etc., and may be associated with various types of users. Thus, the PUEs 104 are UEs, and may be referred to as UEs or UE devices. Note that although the UEs 104 may be referred to as PUEs (pedestrian UEs), they may not necessarily be carried by persons who are actively walking near roads or streets. PUEs may refer to UEs participating in a V2X system that are carried by stationary persons, by persons walking or running, or by persons on vehicles that may not substantially bolster the devices' power capabilities, such as bicycles, scooters, or certain motor vehicles. Note also that not all UEs participating in a V2X system are necessarily PUEs.

The user devices may be capable of communicating using multiple wireless communication standards. For example, the UE 104A may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS, LTE, LTE-A, LTE-V, HSPA, 3GPP2 CDMA2000, 5G NR, etc.). The UE 104A may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

As shown, certain user devices may be able to conduct communications with one another directly, i.e., without an intermediary infrastructure device such as base station 102A or RSU 110A. As shown, vehicle 106A may conduct V2X-related communications directly with vehicle 106B. Similarly, the vehicle 106B may conduct V2X-related communications directly with PUE 104B. Such peer-to-peer communications may utilize a "sidelink" interface such as the PC5 interface in the case of some LTE embodiments, and may generally be referred to as "sidelink communications". In certain LTE embodiments, the PC5 interface supports direct cellular communication between user devices (e.g., between vehicles 106), while the Uu interface supports cellular communications with infrastructure devices such as base stations. The LTE PC5/Uu interfaces are used only as an example, and PC5 as used herein may represent various other possible wireless communications technologies that allow for direct sidelink communications between user devices, while Uu in turn may represent cellular communications conducted between user devices and infrastructure devices, such as base stations. For example, NR V2X sidelink communication techniques can also be used to perform device-to-device communications, at least according to some embodiments. Note also that some user devices in a V2X system (e.g., PUE 104A, as one possibility) may be unable to perform sidelink communications, e.g., because they lack certain hardware necessary to perform such communications.

As shown, the example V2X system includes a number of infrastructure devices in addition to the above-mentioned user devices. As used herein, "infrastructure devices" in the context of V2X systems refers to certain devices in a V2X system which are not user devices, and are not carried by traffic actors (i.e., pedestrians, vehicles, or other mobile users), but rather which facilitate user devices' participation in the V2X network. The infrastructure devices in the example V2X system include base station 102A and roadside unit (RSU) 110A.

The base station (BS) 102A may be a base transceiver station (BTS) or cell site (a "cellular base station"), and may include hardware that enables wireless communication with user devices, e.g., with the user devices 104A and 106A.

The communication area (or coverage area) of the base station may be referred to as a "cell" or "coverage". The base station 102A and user devices such as PUE 104A may be configured to communicate over the transmission medium using any of various radio access technologies (RATs), also referred to as wireless communication technologies, or telecommunication standards, such as GSM, UMTS, LTE, LTE-Advanced (LTE-A), LTE-Vehicle (LTE-V), HSPA, 3GPP2 CDMA2000, 5G NR, etc. Note that if the base station 102A is implemented in the context of LTE, it may alternately be referred to as an 'eNodeB', or eNB. Note that if the base station 102A is implemented in the context of NR, it may alternately be referred to as an 'gNodeB', or gNB.

As shown, the base station 102A may also be equipped to communicate with a network 100 (e.g., the V2X network, as well as a core network of a cellular service provider, a telecommunication network such as a public switched telephone network (PSTN), and/or the Internet, among various possibilities). Thus, the base station 102A may facilitate communication between user devices and/or between user devices and the network 100. The cellular base station 102A may provide user devices, such as UE 104A, with various telecommunication capabilities, such as voice, SMS and/or data services. In particular, the base station 102A may provide connected user devices, such as UE 104A and vehicle 106A, with access to the V2X network.

Thus, while the base station 102A may act as a "serving cell" for user devices 104A and 106A as illustrated in FIG. 1, the user devices 104B and 106B may also be capable of communicating with the base station 102A. The user devices shown, i.e., user devices 104A, 104B, 106A, and 106B may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Roadside unit (RSU) 110A constitutes another infrastructure device usable for providing certain user devices with access to the V2X network. RSU 110A may be one of various types of devices, such as a base station, e.g., a transceiver station (BTS) or cell site (a "cellular base station"), or another type of device that includes hardware that enables wireless communication with user devices and facilitates their participation in the V2X network.

RSU 110A may be configured to communicate using one or more wireless networking communication protocols (e.g., Wi-Fi), cellular communication protocols (e.g., LTE, LTE-V, etc.), and/or other wireless communication protocols. In some embodiments, RSU 110A may be able to communicate with devices using a sidelink technology such as LTE PC5 or NR V2X sidelink communication techniques.

RSU 110A may communicate directly with user devices, such as the vehicles 106A and 106B as shown. RSU 110A may also communicate with the base station 102A. In some cases, RSU 110A may provide certain user devices, e.g., vehicle 106B, with access to the base station 102A. While RSU 110A is shown communicating with vehicles 106, it may also (or otherwise) be able to communicate with PUEs 104. Similarly, RSU 110A may not necessarily forward user device communications to the base station 102A. In some embodiments, the RSU 110A and may constitute a base station itself, and/or may forward communications to the server 120.

The server 120 constitutes a network entity of the V2X system, as shown, and may be referred to as a cloud server. Base station 102A and/or RSU 110A may relay certain V2X-related communications between the user devices 104 and 106 and the server 120. The server 120 may be used to process certain information collected from multiple user devices, and may administer V2X communications to the user devices in order to coordinate traffic activity. In various other embodiments of V2X systems, various functions of the cloud server 120 may be performed by an infrastructure device such as the base station 102A or RSU 110A, performed by one or more user devices, and/or not performed at all.

Figure 2:
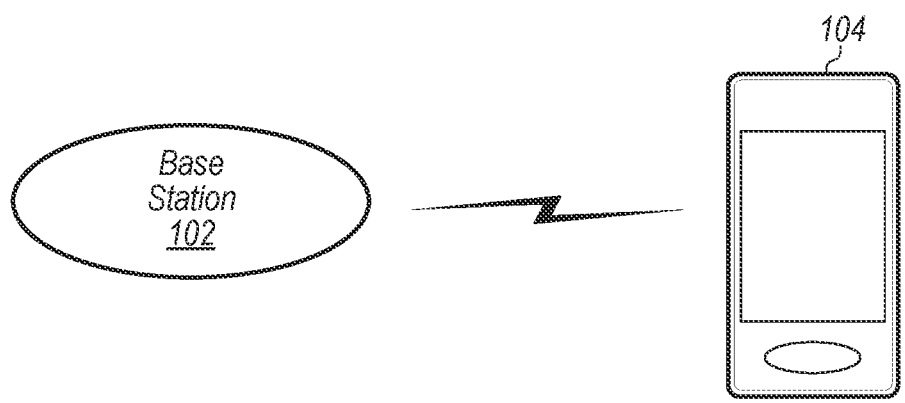
FIG. 2 illustrates a base station in communication with a user equipment (UE) device, according to some embodiments.

FIG. 2—Communication Between a UE and Base Station

FIG. 2 illustrates a user equipment (UE) device 104 (e.g., one of the PUEs 104A or 104B and/or a UE device comprised within a vehicle 106A or 106B in FIG. 1) in communication with a base station 102 (e.g., the base station 102A in FIG. 1), according to some embodiments. The UE 104 may be a device with cellular communication capability such as a mobile phone, a hand-held device, a computer or a tablet, or virtually any type of portable wireless device.

The UE 104 may include a processor that is configured to execute program instructions stored in memory. The UE 104 may perform any of the method embodiments described herein by executing such stored instructions. Alternatively, or in addition, the UE 104 may include a programmable hardware element such as an FPGA (field-programmable gate array) that is configured to perform any of the method embodiments described herein, or any portion of any of the method embodiments described herein.

The UE 104 may include one or more antennas for communicating using one or more wireless communication protocols or technologies. In some embodiments, the UE 104 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 104 may share one or more parts of a receive and/or transmit chain between multiple wireless communication technologies, such as those discussed above.

In some embodiments, the UE 104 may include separate transmit and/or receive chains (e.g., including separate antennas and other radio components) for each wireless communication protocol with which it is configured to communicate. As a further possibility, the UE 104 may include one or more radios which are shared between multiple wireless communication protocols, and one or more radios which are used exclusively by a single wireless communication protocol. For example, the UE 104 might include a shared radio for communicating using either of LTE or 1×RTT (or LTE or GSM), and separate radios for communicating using each of Wi-Fi and Bluetooth. Other configurations are also possible.

Figure 3:
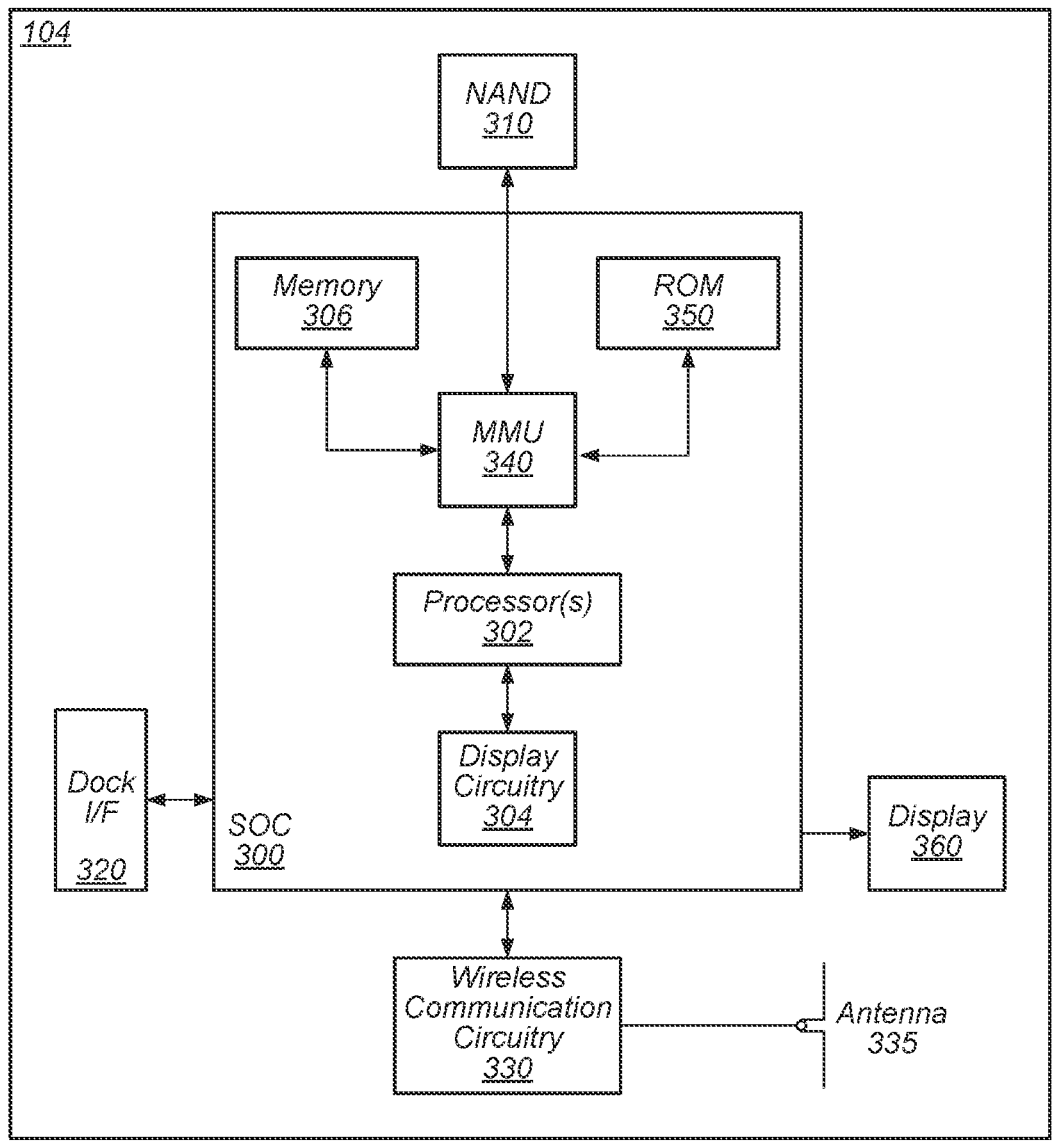
FIG. 3 is an example block diagram of a UE, according to some embodiments.

FIG. 3—Block Diagram of a UE

FIG. 3 illustrates an example block diagram of a UE 104, according to some embodiments. As shown, the UE 104 may include a system on chip (SOC) 300, which may include portions for various purposes. For example, as shown, the SOC 300 may include processor(s) 302 which may execute program instructions for the UE 104 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 104. For example, the UE 104 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, LTE-V, 5G NR, CDMA2000, Bluetooth, Wi-Fi, GPS, etc.). The UE may also include at least one SIM device, and may include two SIM devices, each providing a respective international mobile subscriber identity (IMSI) and associated functionality.

As shown, the UE device 104 may include at least one antenna (and possibly multiple antennas, e.g., for MIMO and/or for implementing different wireless communication technologies, among various possibilities) for performing wireless communication with base stations, access points, and/or other devices. For example, the UE device 104 may use antenna 335 to perform the wireless communication.

The UE 104 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

As described herein, the UE 104 may include hardware and software components for implementing features for performing unicast sidelink access stratum level connection maintenance, such as those described herein. The processor 302 of the UE device 104 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 104, in conjunction with one or more of the other components 300, 304, 306, 310, 320, 330, 335, 340, 350, 360 may be configured to implement part or all of the features described herein, such as the features described herein.

Figure 4:
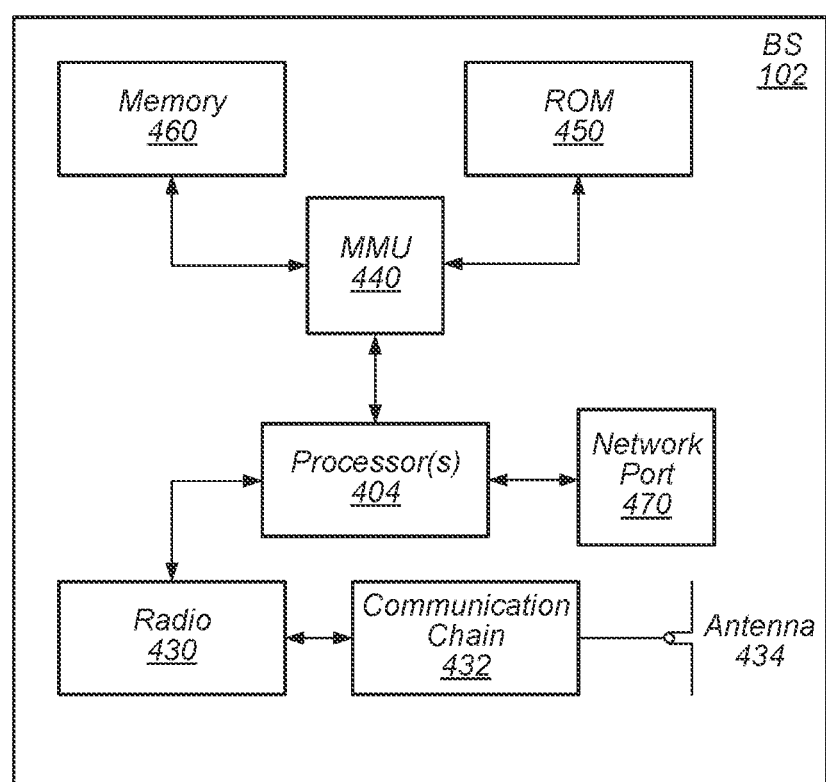
FIG. 4 is an example block diagram of a base station, according to some embodiments.

FIG. 4—Block Diagram of a Base Station

FIG. 4 illustrates an example block diagram of a base station 102 (e.g., base station 102A in FIG. 1), according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 104, access to the telephone network The network port 470 (or an additional network port) may also or alternatively be configured to couple to a cellular network, e.g., a core network of a cellular service provider. The core network may provide mobility related services and/or other services to a plurality of devices, such as UE devices 104. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 104 via radio 430. The antenna 434 communicates with the radio 430 via communication chain 432. Communication chain 432 may be a receive chain, a transmit chain or both. The radio 430 may be configured to communicate via various wireless communication standards, including, but not limited to, LTE, LTE-A, LTE-V, GSM, UMTS, CDMA2000, 5G NR, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Sidelink Communications

In wireless communications, specifically cellular wireless communications, sidelink communications represent a special kind of communication mechanism between devices that is not carried through a base station, e.g., through an eNB/gNB. In other words, the devices communicate with each other without that communication going through a base station. In one sense, the devices may be said to be communicating with each other directly. Accommodation of such communication, however, may utilize a new physical layer design.

Many recent studies have identified the need for technical solutions for sidelink design, e.g. a sidelink design in 5G-NR, to meet the requirements of advanced V2X services, including support of sidelink unicast, sidelink groupcast and sidelink broadcast. A number of specific use cases have been identified for advanced V2X services, categorized into four groups: vehicle platooning, extended sensors, advanced driving, and remote driving. Platooning is a cooperative driving application according to which multiple vehicles travel in the same lane as in a convoy, keeping a specified (preferably constant) inter-vehicle distance between each other in order to increase their traffic efficiency, e.g. to reduce fuel consumption and gas emissions and to achieve safe and efficient transport. To achieve platooning, vehicles in a platoon may use multiple on-board sensors (e.g., radars, lidars—light detection and ranging, positioning systems, etc.) and sidelink vehicle-to-vehicle communications to synchronize their on-road operations, e.g. pertaining to breaking, changing lanes, stopping, etc. Vehicle platooning may utilize both groupcast transmissions (e.g. for relaying status information for platoon management) and unicast transmissions (e.g. for communication between two members). Efficient intra-platooning communications and inter-platooning communications may help achieve better spectrum/power efficiency while maintaining fair resource competition, e.g. between members of the same platoon and also between platoons, (consequently, between members of different platoons).

In C-V2X, multiple resource allocation modes may be employed for sidelink communications, with different mechanisms for allocating sidelink communication resources. For example, C-V2X may utilize "mode 1", whereby sidelink communication resources are allocated by the network (NW) (for example, through dynamic scheduling or semi-persistent scheduling (SPS)), or "mode 2", where resource allocation is performed autonomously by the UE (e.g., such that the UE autonomously selects the resources to use for communications), as specified by LTE Release 12. Alternatively or additionally, C-V2X may utilize "mode 3" which operates similar to mode 1 (i.e., sidelink communication resources are allocated by the NW), and "mode 4" which operates similar to mode 2 (i.e., resource allocation is performed autonomously by the UE), as specified by LTE release 14. In this context, "resource allocation" may be understood to refer to the allocation of one or both of time slots and/or frequency slots (e.g., subcarriers) for use in performing sidelink communications. The resources may be allocated within one or more "pools", in some embodiments. For example, a "mode 2 pool" of time slots and corresponding subcarrier frequencies may be configured by a base station, wherein the mode 2 pool describes the set of time and frequency resources available for performing mode 2 sidelink communications. Additionally or alternatively, an "exceptional pool" may be utilized by a UE during a transition from RRC_Idle to RRC_Connected, and a "pre-configured pool" may be pre-configured for a UE to use, in certain circumstances.

In some embodiments, a dual-mode UE (or mixed-mode UE) may be utilized, whereby the UE is able to switch between mode 1 and mode 2 operation. Advantageously, a dual-mode UE may be employed without introducing backwards-compatibility issues with other UEs, as the receiving UE may be transparent to the transmitting mode used. For example, if a 5GNR-V2X UE supports dual-mode operation, it may apply it even to LTE V2X R14 transmissions. For example, it may alternate mode selection to transmit basic safety messages (BSM) in a R14 format.

In some embodiments, a UE may only be capable of communicating according to one mode at one time. For example, at one time, all sidelink transmissions may be of the same mode. Alternatively, in some embodiments a UE may support simultaneous dual-mode operation, whereby at one time some sidelink transmissions are done in mode 1, and other sidelink transmissions are done in mode 2.

Figure 5A:
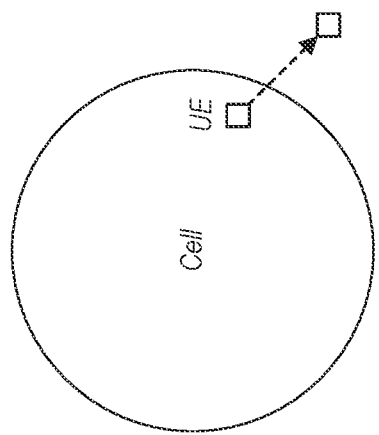
FIG. 5A illustrates a wireless device moving out-of-coverage, according to some embodiments.
Figure 5B:
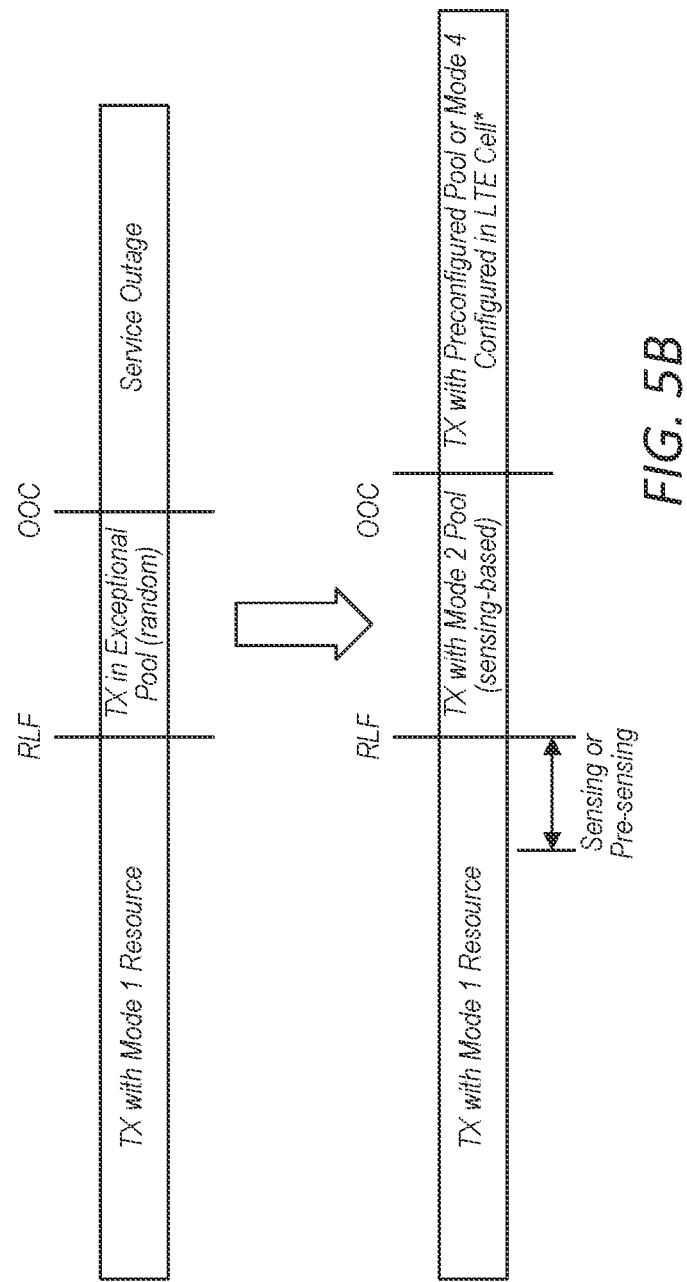
FIG. 5B illustrates two methods for operating a dual-mode wireless device while moving out-of-coverage, according to some embodiments.

FIGS. 5A-5B—Mode Switching when Moving Out-of-coverage

Because mode 1 operation relies on the network to allocate resources, mode 1 may only function properly when the UE has cellular coverage. In contrast, mode 2 may function both in and out of coverage. FIG. 5A illustrates a scenario where a UE such as a PUE 104 or a vehicle 106 containing a wireless device moves from a coverage area of a cellular network to an out-of-coverage scenario, according to some embodiments. During such a scenario, FIG. 5B illustrates both a legacy mechanism for performing sidelink communications (top) and a method for enacting mode switching (bottom), according to some embodiments. For a dual-mode UE moving out of coverage, it may be desirable to switch from mode 1 to mode 2 using a pre-configured resource pool. Embodiments herein describe methods and devices to accommodate dual mode UE operations and potential mode switch issues related to changing coverage scenarios.

Various changes to coverage scenarios may benefit from mode switching, according to various embodiments. For example, switching to mode 2 may be desirable if a NR V2X UE operating in mode 1 moves out of (NR/LTE) coverage to out-of-coverage (OOC), or if a NR V2X UE operating in mode 1 moves from NR coverage to LTE coverage, but does not support LTE inter-RAT scheduling. FIG. 5A may be understood to cover either of these scenarios. As illustrated in the top half of FIG. 5B some previous implementations may operate as follows: a UE may transmit (TX) communications according to mode 1 allocated resources when a radio link failure (RLF) is detected, indicating that the UE may be moving toward an OOC scenario. As illustrated, the UE may switch to transmitting with resources selected at random from the exceptional pool. Finally, when the UE is fully out of range of the cell, the UE may transition to a service outage status.

In contrast, the bottom half of FIG. 5B illustrates a method whereby a UE performs sensing or pre-sensing of communication resources associated with a mode 2 pool. Advantageously, when a RLF is detected, the UE may have sufficient knowledge obtained from the sensing (or pre-sensing) to transition to transmitting communications with available resources from the mode 2 pool. Finally, when the UE moves entirely OOC of the cell, the UE may transmit communications with a preconfigured pool. Alternatively, if the cell that the UE is moving OOC from is a 5G NR gNB, and the UE is moving into coverage of an LTE eNB and is configured for dual-RAT V2X services over both LTE and 5G NR, when the UE moves OOC of the gNB and into service of the eNB, the UE may transmit with resources within a mode 4 pool configured in the LTE cell, in some embodiments.

In some embodiments, instead of experiencing a service outage upon moving to an OOC area, the UE may use a pre-configuration for mode 2. In some embodiments, sensing-based resource selection may be utilized in a mode 2 pool, rather than random resource selection. Sensing-based resource selection may improve selection performance, and sensing may be done in either an exceptional pool or a regular mode 2 pool, in various embodiments. The dual mode UE may evaluate resources within one or more mode 2 pools while performing mode 1 sidelink communications. For example, if the UE is configured to conduct mode 2 traffic simultaneously with mode 1 traffic, the sensing results may be utilized to conduct a mode switch for mode 1 sidelink traffic. If the UE is not conducting mode 2 traffic simultaneously with mode 1 traffic, it may still perform pre-sensing of the mode 2 pools configured by a base station, and may switch to mode 2 when a radio link failure (RLF) occurs.

Figure 6A:
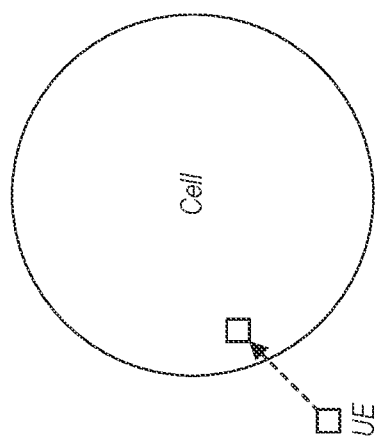
FIG. 6A illustrates a wireless device moving into coverage, according to some embodiments.
Figure 6B:
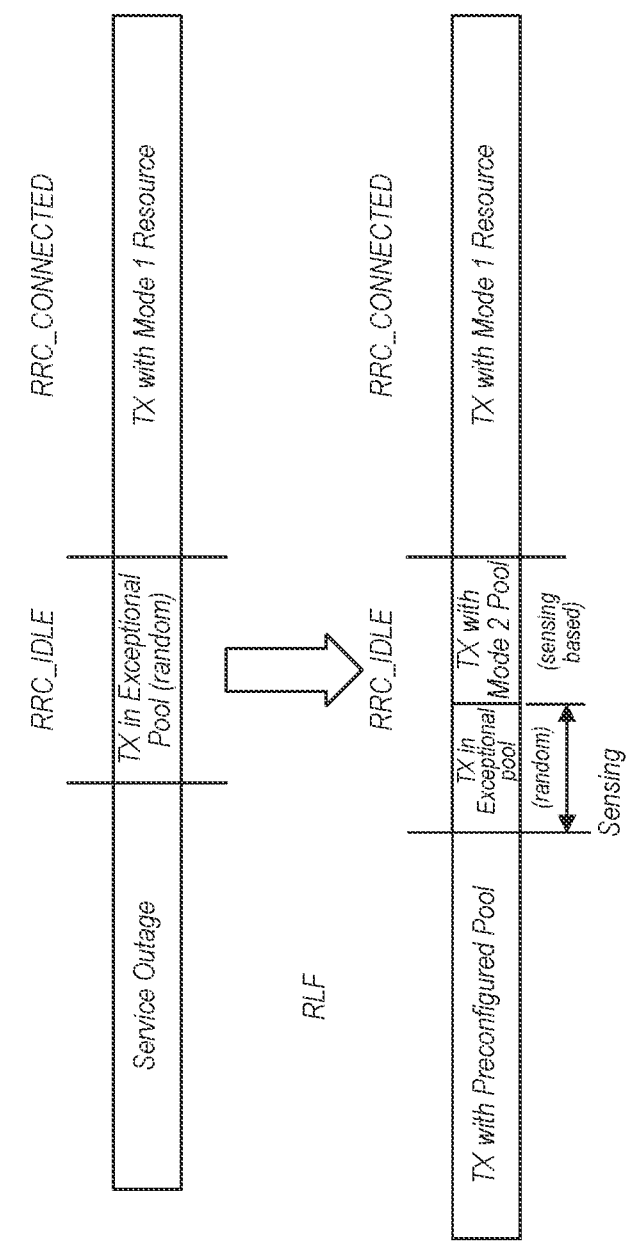
FIG. 6B illustrates two methods for operating a dual-mode wireless device when the wireless device moves from out-of-coverage to an in-coverage scenario, according to some embodiments.

FIGS. 6A-6B Mode Switching when Moving In-Coverage

FIG. 6A illustrates an alternative scenario to FIG. 5A, wherein a UE moves from OOC to an in-coverage scenario. During such a scenario, FIG. 6B illustrates both a legacy mechanism for performing sidelink communications (top) and a method for enacting mode switching (bottom), according to some embodiments. In some embodiments, mode switching may be utilized in a dual-mode UE that moves from an OOC scenario to an in-coverage scenario. For example, a NR V2X-capable UE may move from OOC to an in-coverage area, and may initiate a process to use mode 1 in an RRC_Connected mode with a newly discovered base station. Alternatively, a NR V2X UE operating in LTE mode 4 may move into NR coverage and may want to switch to mode 1.

As illustrated in the top half of FIG. 6B, in some previous implementations, a UE may transmit using a random resource within the exceptional pool while the UE is in RRC_Idle state and is attempting to connect to the base station. In contrast, in the bottom half of FIG. 6B, during a transition from RRC_Idle to RRC_Connected, sensing-based resource selection may be utilized in a mode 2 pool rather than random resource selection in the exceptional pool. In some embodiments, when sensing results for a mode-2 transmission pool are not yet available when the new cell is detected, the exceptional pool may be used temporarily while the UE uses the sensing to determine an available or desirable resource from the mode 2 pool. Subsequently, the UE may perform transmission using resources in the mode 2 pool until the RRC_Connected state is established with the base station and the UE transitions to performing mode 1 transmissions.

In some embodiments, a LTE-V2X UE may switch to use the exceptional pool when physical layer problems are detected in the Uu interface. For example, at the edge of the cell, after a UE sends a buffer status report (BSR), the UE may move further away from the eNB/gNB and the UE may fail to receive the DCI 5A in the PDCCH channel due to deteriorating channel conditions. In this case, the UE may end up using resources from the exceptional pool, but the mode 1 sidelink grant allocated by the NW may be wasted and the network may not be informed that the grant is not used. In this case, various embodiments may be utilized to address these and other concerns. For example, the UE may continue mode 1 scheduling, which may have the advantage that the base station allocated grant generally experiences a better quality of service. However, this may have the disadvantage that, if the UE fails tot receive the grant, the grant may be wasted. Alternatively, the UE may perform random selection on the exceptional pool. This may have the advantage that the base station may not waste a mode 1 resource grant, however, random selection in the exceptional pool may end up choosing a poor transmission resource and may result in a sidelink transmission failure. As another possibility, if the UE is a dual-mode UE, the UE may use sensing-based mode 2 pool resource selection. This may have the advantage of avoiding the risk of a Uu failure, while still providing for the selection of a functional sidelink grant.

Figure 7A:
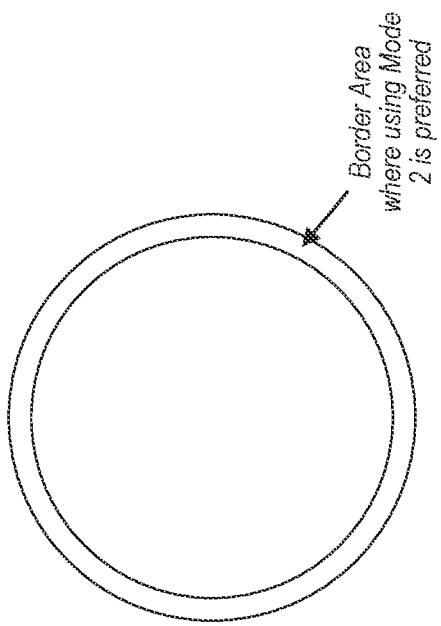
FIG. 7A illustrates a border area where mode 2 is preferred, according to some embodiments.
Figure 7B:
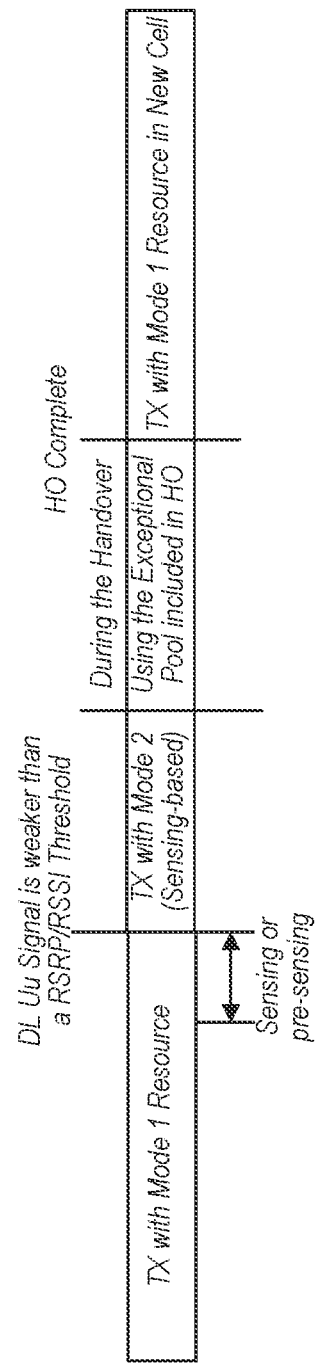
FIG. 7B illustrates utilizing a border area for initiating a transition to mode 2 communications, according to some embodiments.

FIGS. 7A-7B—Pre-Emptive Mode Switch in Border Area

In some embodiments, for a dual mode UE, a pre-emptive switch to transmission mode 2 may be performed when the UE is in adverse or marginal channel conditions. For example, as illustrated in FIG. 7A, protective zones may be used for performing a preemptive mode switch. In some embodiments, a cell-border area may be configured where a dual-mode UE prefers mode 2 operation to mode 1 operation. For example, the network may configure a received signal strength indicator (RSSI) or a received signal to received power ratio (RSRP) threshold in the Uu interface for sidelink communications, and a dual-mode UE may be configured to switch from mode 1 to mode 2 when the RSSI or RSRP drops below the threshold. As illustrated in FIG. 7B, when a downlink Uu signal is determined by the UE to be weaker than an RSRP or RSSI threshold, the UE may switch to using mode 2 for transmissions, wherein the mode 2 resource used is determined based on sensing or pre-sensing. Subsequently, when another cell is detected and a handover procedure to the new cell is initiated, the UE may switch to using the exceptional pool included in the handover (HO) for transmissions, and when handover is complete, the UE may transmit using mode 1 resources in the new cell.

In some embodiments, the S-measure may be reused so that a new RRC-configured threshold may be avoided. Advantageously, a dynamic scheduling failure may be avoided in unfavorable channel conditions since, during handover, the UE may preemptively switch to mode 2 to avoid mode 1 sidelink transmission failures.

Figure 8:
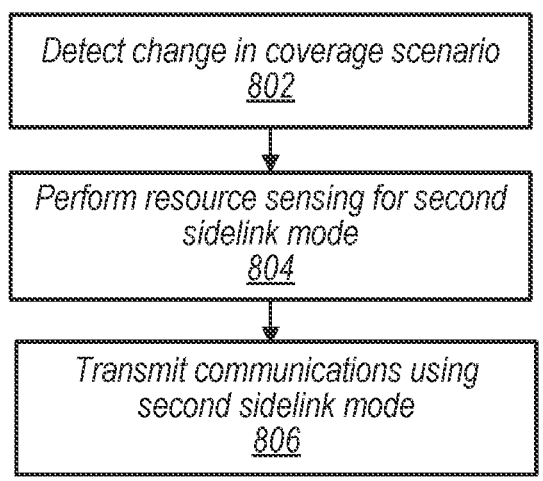
FIG. 8 is a flowchart diagram illustrating aspects of an exemplary technique for performing sensing-based mode 2 sidelink communications, according to some embodiments.

FIG. 8—Flowchart Dynamic Mode Switching

FIG. 8 is a flowchart diagram illustrating a method for performing dynamic mode switching by a V2X-configured wireless device, according to some embodiments. The method described in FIG. 8 may be performed by a wireless device configured with at least one antenna for performing wireless communications, a radio coupled to the at least one antenna, and a processor coupled to the radio. The wireless device may be comprised within a vehicle, in some embodiments. The wireless device may be configured to operate according to a first sidelink mode where communication resources are allocated by a network and a second sidelink mode where communication resources are autonomously selected by the wireless device. The communication resources may include one or both of time and frequency resources (e.g., time slots and subcarriers) for communicating according to either of the first or second sidelink modes. Communication resources may be included within a plurality of pools of communication resources, which may be configured by a network for different purposes (e.g., different pools may be allocated for first and second sidelink mode communications, or other purposes). In various embodiments, some of the elements of the methods shown may be performed concurrently, in a different order than shown, may be substituted for by other method elements, or may be omitted. Additional method elements may also be performed as desired. As shown, the method may operate as follows.

At 802, a change in a coverage scenario associated with the first sidelink mode is detected. The change in the coverage scenario may be of a variety of types, in various embodiments. For example, the change in the coverage scenario may include detecting a radio link failure associated with the first sidelink mode, detecting that a signal strength of a cell associated with the first sidelink mode has fallen below a predetermined threshold, detecting that the wireless device has moved out-of-coverage with respect to the network associated with the first sidelink mode, or detecting that the wireless device has moved from out-of-coverage to in-coverage of a network associated with the first sidelink mode. For embodiments where the change in the coverage scenario includes detecting the signal strength of the cell associated with the first sidelink mode has fallen below a predetermined threshold, the signal strength may be either of a received signal strength indicator (RSSI) or a received signal to received power ratio (RSRP), among other possibilities.

At 804, resource sensing is performed for the second sidelink mode. Sensing may include determining availability of one or more communication resources within a pool associated with the second sidelink mode. In some embodiments, performing resource sensing for the second sidelink mode includes performing pre-sensing for the second sidelink mode while the wireless device is communicating according to the first sidelink mode.

At 806, based at least in part on detecting the change in the coverage scenario, first communications are transmitted using the second sidelink mode, wherein resources for transmitting the first communications are selected based at least in part on the resource sensing. For example, sensing (or pre-sensing) may be utilized at step 804 to determine one or more available communication resource(s) for performing mode 2 sidelink communications, and the available communication resource(s) may be utilized at step 806 for transmitting sidelink communications in response to detecting the change in the coverage scenario.

In some embodiments, it may be determined that a handover procedure has been initiated while the wireless device is transmitting the first communications using the second sidelink mode. At least in part in response to determining that the handover procedure has been initiated, the wireless device may switch from transmitting the first communications using the second sidelink mode to transmitting second communications using an exceptional pool associated with the handover procedure. In some embodiments, after completing the handover procedure, communications may be conducted according to the first sidelink mode.

Dual-mode Sidelink Operation Conflicts

In some embodiments, conflicts may arise in a dual-mode UE may be capable of transmitting according to both mode 1 and mode 2. For example, a potential conflict may occur between mode 1 and mode 2 transmission resources if the resources overlap in time and frequency. Alternatively, sidelink resources for mode 1 and mode 3 may overlap in time but may utilize different subcarriers in frequency, but the UE may not be capable of conducting more than one sidelink transmission at a time. As yet another example, a UE may be capable of transmitting more than one sidelink transmissions at a time, but the two transmissions in modes 1 and 2 may be scheduled in different beam directions, and the UE may not be able to simultaneously transmit in two different beam directions. These and other types of conflicts may occur because the base station may conduct mode 1 resource allocation without knowing which mode 2 resource(s) are reserved by the UE for mode 2 transmission.

To address these and other concerns, some embodiments utilize a sidelink prioritization method to deal with potential transmission conflicts. For example, when a conflict occurs between a mode 1 transmission and a mode 2 transmission, the UE may compare priorities of the highest-priority of the logical channel multiplexed in the two conflicting media access control (MAC) packet data units (PDUs) for the mode 1 and mode 2 transmissions, respectively. In these embodiments, direct comparison of sidelink priority levels may be performed between the two transmissions, and preference for transmission may be granted to the higher priority transmission. As one example, each transmission may be assigned a priority from 0 to 7, and the mode 1 and mode 2 transmission priorities may be compared.

In some cases, both transmissions may have the same priority (e.g., the MAC PDUs of the two modes may have the same highest priority), and various rules may be employed to break the tie, according to various embodiments. In some embodiments, tie-breaking may be decided based on mode, whereby mode 1 is preferred over mode 2, or vice versa, in cases where they have a tie for priority. Alternatively, in some embodiments ties may be broken by comparing the second highest priority logical channel of each mode transmission. For example, if the MAC PDU multiplexes the traffic from more than 1 logical channel, the second-highest priority of the logical channels in the two MACs PDU may be compared. If the $2^{nd}$ priority is also the same for mode 1 and mode 2, then the $3^{rd}$ highest priority may be compared, on so on. As a third option, in some embodiments ties may be broken based on hybrid automatic repeat request (HARQ) status. For example, if a first transmission in a first mode is the last transmission in a HARQ process, but a second transmission in a second mode is the first transmission in a HARQ process, the UE may deprioritize the transmission in the second mode, so that the first transmission may still have a chance to be successfully delivered.

In any of these embodiments, for the sidelink transmission which is not chosen, the UE may reattempt to schedule the transmission with dynamic mode 1 or mode 2 scheduling.

In some embodiments, mechanisms may be employed to avoid scheduling conflicts between mode 1 and mode 2 transmissions. As a first possibility, for the UE's mode 2 resource allocation, it may take into account all the configured Type 1 and Type 2 grants scheduled for mode 1 into the "resource exclusion" step so that it will not end up choosing a sidelink resource colliding with mode 1 sidelink grants. As a second possibility, when the UE sends Uu signaling assisting the scheduling of its sidelink traffic to the network, it may add a list or bitmap of "blacklisted resources", so that the gNB or eNB may try to avoid allocating sidelink transmissions that conflict with mode 2 resources. Various formats may be used to communicate this information. For example, a bitmap of 20-bits, 50-bits, or another number of bits may be used, where the number of bits is set to be within the packet delay budget (e.g., 20 ms or 50 ms). In other embodiments, a list may explicitly list all time occasions of the forbidden resource within the packet delay budget. In some embodiments, the conflict embodiments may be included within a buffer status report (BSR), or within radio resource control (RRC) signaling such as SidelinkUEInformation, UEAssistanceInformation, or MeasureReport fields.

Figure 9:
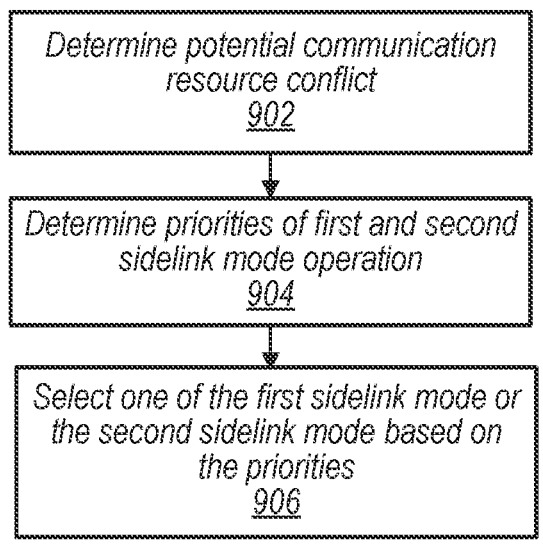
FIG. 9 is a flowchart diagram illustrating aspects of an exemplary technique for avoid communication resource conflicts in a dual-mode device, according to some embodiments.

FIG. 9—Flowchart Resource Conflict Resolution

FIG. 9 is a flowchart diagram illustrating a method for performing resource conflict resolution by a dual-mode V2X-configured wireless device, according to some embodiments. The method described in FIG. 9 may be performed by a wireless device configured with at least one antenna for performing wireless communications, a radio coupled to the at least one antenna, and a processor coupled to the radio. The wireless device may be comprised within a vehicle, in some embodiments. The wireless device may be configured to operate according to a first sidelink mode where communication resources are allocated by a network and a second sidelink mode where communication resources are autonomously selected by the wireless device. The communication resources may include one or both of time and frequency resources (e.g., time slots and subcarriers) for communicating according to either of the first or second sidelink modes. Communication resources may be included within a plurality of pools of communication resources, which may be configured by a network for different purposes (e.g., different pools may be allocated for first and second sidelink mode communications, or other purposes). In various embodiments, some of the elements of the methods shown may be performed concurrently, in a different order than shown, may be substituted for by other method elements, or may be omitted. Additional method elements may also be performed as desired. As shown, the method may operate as follows.

At 902, a potential communication resource conflict resultant from operating according to the first sidelink mode and operating according to the second sidelink mode is determined. In some embodiments, the potential communication resource conflict is an overlap in time and frequency resources for operating according to the first and second sidelink modes (i.e., communications from both the first and second sidelink modes are allocated to use the same time and frequency resource). In some embodiments, the wireless device is not capable of performing simultaneous transmissions on multiple subcarriers, and the potential communication resource conflict is an overlap in time (i.e, but not necessarily an overlap in frequency) for operating according to the first and second sidelink modes on different subcarriers. In some embodiments, the wireless device is capable of performing multiple simultaneous transmissions, and the potential communication resource conflict results from performing simultaneous transmissions according to the first and second sidelink modes in different beam directions. In other words, the potential communication resource conflict may arise because the antenna(s) of the UE are incapable of simultaneously transmitting according to each of the first and second sidelink modes in two different beam directions.

At 904, in response to determining the potential communication resource conflict, a first priority associated with operating according to the first sidelink mode and a second priority associated with operating according to the second sidelink mode are determined. The first and second priorities may each be associated with a respective logical channel used for transmissions in the first and second sidelink modes, respectively. In some embodiments, one or both of the first and second sidelink modes may utilize multiplexing, whereby the UE transmits using multiple logical channels, each of which are assigned a priority. In these embodiments, the highest priority logical channel associated with each of the first and second sidelink modes may be used for comparison.

At 906, one of the first sidelink mode or the second sidelink mode is selected for transmitting communications, wherein said selecting is performed based at least in part on a comparison of the first priority and the second priority. For example, the sidelink mode with the higher priority may be selected for transmitting communications, while the other sidelink mode may have its transmission delayed (e.g., until the higher priority transmission is complete, whereupon the lower priority transmission may be scheduled and performed).

In some cases, the first priority matches the second priority, and various mechanisms may be employed to break the tie, as described in the following paragraphs, in various embodiments.

For example, in some embodiments, it may be determined that the first priority matches the second priority, and a number of hybrid automatic repeat request (HARQ) attempts associated with the communications of the first and second sidelink modes may be used to break the tie. For example, based on determining that the first priority matches the second priority, a number of HARQ attempts associated with a first communication according the first sidelink mode and a second communication associated with the second sidelink mode may be determined. In these embodiments, selecting one of the first sidelink mode or the second sidelink mode for transmitting communications may include selecting a sidelink mode associated with a communication associated with a larger number of HARQ attempts.

In some embodiments, when it is determined that the first priority matches the second priority, one or the other of the first or second sidelink modes may be set to take priority by default. For example, the wireless device may select the first sidelink mode for transmitting communications based on the determination that the first priority matches the second priority, or alternatively, the wireless device may default to selecting the second sidelink mode for transmitting communications when the two priorities are tied.

In some embodiments, when the transmissions associated with the first and second sidelink modes are multiplexed over multiple physical channels, the first and second priorities may be priorities of the highest priority logical channel of each of the two modes. In these embodiments, if the first and second priorities tie, the second highest priorities of the logical channels used by the first and second sidelink modes may be compared to break the tie. In other words, in some embodiments, communications associated with the first sidelink modes are performed using at least a first and second logical channel, wherein the first priority is associated with the first logical channel, and communications associated with the second sidelink modes are performed using at least a third and a fourth logical channel, wherein the second priority is associated with the third logical channel. In these embodiments, when it is determined that the first priority matches the second priority, one of the first sidelink mode or the second sidelink mode may be selected for transmitting communications further based at least in part on a comparison of priorities of the second and fourth logical channels.

In some embodiments, rather than utilizing transmission priorities to resolve transmission resource conflicts, methods and devices may be utilized to pre-emptively prevent potential resource conflicts from occurring. For example, a method for operating a wireless device may include, by the wireless device, operating according to a first sidelink mode, wherein communication resources are allocated by a network while operating in the first sidelink mode; operating according to a second sidelink mode, wherein communication resources are autonomously selected by the wireless device while operating in the second sidelink mode; and determining a plurality of communication resources allocated for operating according to the first sidelink mode, wherein said autonomously selecting communication resources by the wireless device while operating in the second sidelink mode is performed such that a potential conflict with the plurality of communication resources allocated for operating according to the first sidelink mode is avoided.

In some embodiments, determining the plurality of resources allocated for operating according to the first sidelink mode is performed based on one or both of type 1 or type 2 configured grants scheduled for the first sidelink mode.

In some embodiments, a method for operating a wireless device comprises, by a wireless device: operating according to a first sidelink mode, wherein first communication resources are allocated by a network while operating in the first sidelink mode; operating according to a second sidelink mode, wherein second communication resources are autonomously selected by the wireless device while operating in the second sidelink mode; and transmitting a message to the network, wherein the message comprises information related to the second communication resources, and wherein the message is useable by the network to avoid a conflict between the first communication resources and the second communication resources.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

As described above, one aspect of the present technology is the gathering and use of data available from specific and legitimate sources to improve coordination of traffic flow in traffic environments. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data may be used to better harmonize traffic flow in the user's environment, such that transportation of the user and other users becomes more efficient. Further, the personal data may improve safety of the user (and other users) by averting traffic accidents, particularly vehicular collisions. For example, in the case of a pedestrian user, the personal information, particularly movement- and position-related information, may operate to avert potentially fatal collisions between vehicles and the user. Also, the personal information may be usable to reduce resource and power consumption by user devices benefitting from traffic-related networks, which may improve users' experiences.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data for use in vehicle- and transportation-related networks. In another example, users can select not to provide certain personal data, such as location or movement data, to V2X networks for traffic safety and coordination purposes. In yet another example, users may be able to select to limit the length of time or degree to which traffic-associated data is maintained or entirely block the development of a baseline traffic or vehicle profile. In addition to providing "opt in" and "opt out" options, the present disclosure contemplates providing notifications relating to the access or use of personal information. For instance, a user may be notified that their personal information data will be accessed for use in vehicle and transportation networks.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna for performing wireless communications;
   a radio coupled to the at least one antenna; and
   a processor coupled to the radio;
   wherein the wireless device is configured to:
   operate according to a first sidelink mode, wherein first communication resources are allocated by a network while operating in the first sidelink mode;
   operate according to a second sidelink mode, wherein second communication resources are autonomously selected by the wireless device while operating in the second sidelink mode; and
   transmit Uu signaling to the network, wherein the Uu signaling comprises an indication of prohibited communication resources from the first communication resources allocated by the network that conflict with the autonomously selected second communication resources.

2. The wireless device of claim 1,
   wherein the wireless device is further configured to determine a plurality of the first communication resources allocated for operating according to the first sidelink mode based on one or both of type 1 or type 2 configured grants scheduled for the first sidelink mode.

3. The wireless device of claim 1,
   wherein the wireless device is further configured to:
   determine that a handover procedure has been initiated while the wireless device is transmitting first communications using the second sidelink mode; and
   at least in part in response to determining that the handover procedure has been initiated, switch from transmitting the first communications using the second sidelink mode to transmitting second communications using an exceptional pool associated with the handover procedure.

4. The wireless device of claim 3,
   wherein the wireless device is further configured to:

after completing the handover procedure, conducting communications according to the first sidelink mode.

5. The wireless device of claim 3, wherein the handover procedure is initiated based on detecting that a signal strength of a cell associated with the first sidelink mode has fallen below a predetermined threshold.

6. The wireless device of claim 5, wherein the signal strength is a received signal strength indicator (RSSI) or a received signal to received power ratio (RSRP).

7. The wireless device of claim 1, wherein the wireless device is comprised within a vehicle.

8. The wireless device of claim 1, wherein the communication resources comprise one or more of:
time slots; and
frequency subcarriers.

9. A method for operating a wireless device, the method comprising:
by the wireless device:
operating according to a first sidelink mode, wherein first communication resources are allocated by a network while operating in the first sidelink mode;
operating according to a second sidelink mode, wherein second communication resources are autonomously selected by the wireless device while operating in the second sidelink mode; and
transmitting Uu signaling to the network, wherein the Uu signaling comprises an indication of prohibited communication resources from the first communication resources allocated by the network that conflict with the autonomously selected second communication resources.

10. The method of claim 9, further comprising:
determining a plurality of the first communication resources allocated for operating according to the first sidelink mode based on one or both of type 1 or type 2 configured grants scheduled for the first sidelink mode.

11. The method of claim 9, the method further comprising:
determining that a handover procedure has been initiated while the wireless device is transmitting first communications using the second sidelink mode; and
at least in part in response to determining that the handover procedure has been initiated, switching from transmitting the first communications using the second sidelink mode to transmitting second communications using an exceptional pool associated with the handover procedure.

12. The method of claim 11, wherein the handover procedure is initiated based on detecting that a signal strength of a cell associated with the first sidelink mode has fallen below a predetermined threshold.

13. The method of claim 12, wherein the signal strength is a received signal strength indicator (RSSI) or a received signal to received power ratio (RSRP).

14. The method of claim 9, wherein the wireless device is comprised within a vehicle.

15. The method of claim 9, wherein the communication resources comprise one or more of:
time slots; and
frequency subcarriers.

16. An apparatus, comprising:
a processor configured to cause a wireless device to:
operate according to a first sidelink mode, wherein first communication resources are allocated by a network while operating in the first sidelink mode;
operate according to a second sidelink mode, wherein second communication resources are autonomously selected by the wireless device while operating in the second sidelink mode; and
transmit Uu signaling to the network, wherein the Uu signaling comprises an indication of prohibited communication resources from the first communication resources allocated by the network that conflict with the autonomously selected second communication resources.

17. The apparatus of claim 16, wherein the processor is further configured to cause the wireless device to determine a plurality of the first communication resources allocated for operating according to the first sidelink mode based on one or both of type 1 or type 2 configured grants scheduled for the first sidelink mode.

18. The apparatus of claim 16, wherein the processor is further configured to cause the wireless device to:
determine that a handover procedure has been initiated while the wireless device is transmitting first communications using the second sidelink mode; and
at least in part in response to determining that the handover procedure has been initiated, switch from transmitting the first communications using the second sidelink mode to transmitting second communications using an exceptional pool associated with the handover procedure; and
after completing the handover procedure, conducting communications according to the first sidelink mode.

19. The apparatus of claim 16, wherein the wireless device is comprised within a vehicle.

20. The apparatus of claim 16, wherein the communication resources comprise one or more of:
time slots; and
frequency subcarriers.

* * * * *